June 2, 1925.  
C. A. TERWILLIGER  
AUTOMOBILE BED  
Filed Nov. 26, 1924
1,539,971
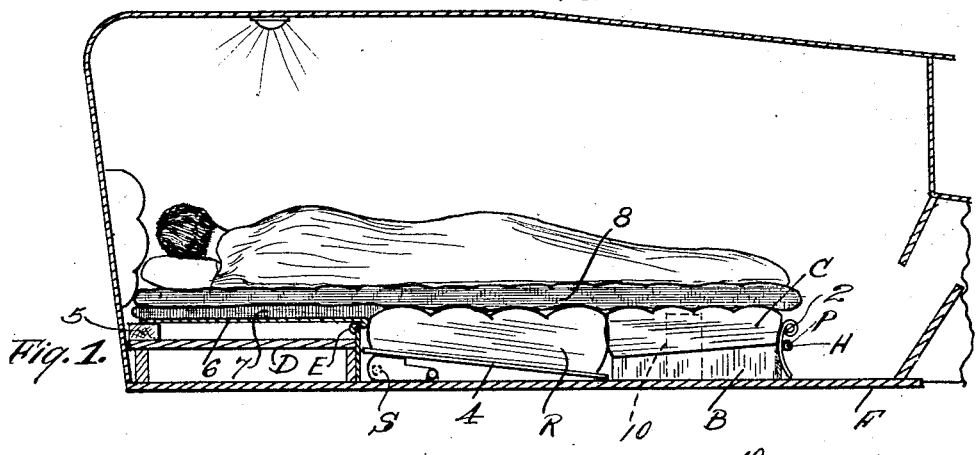
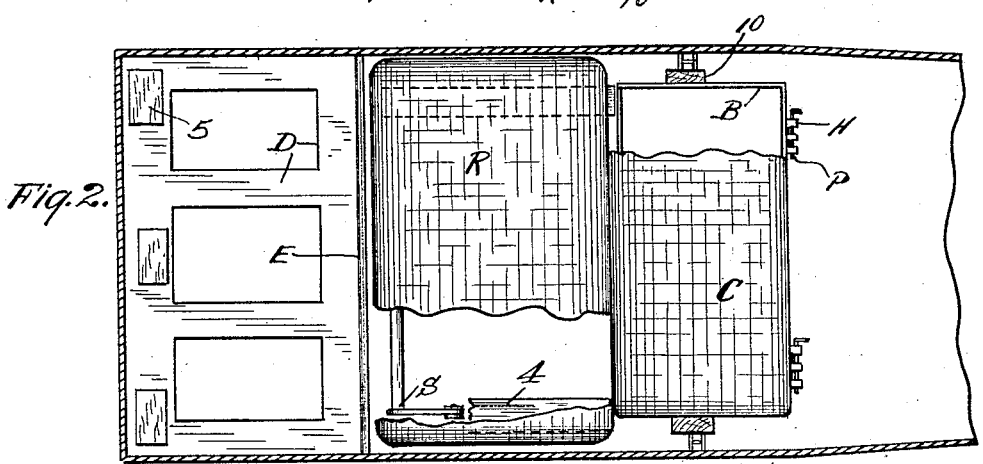
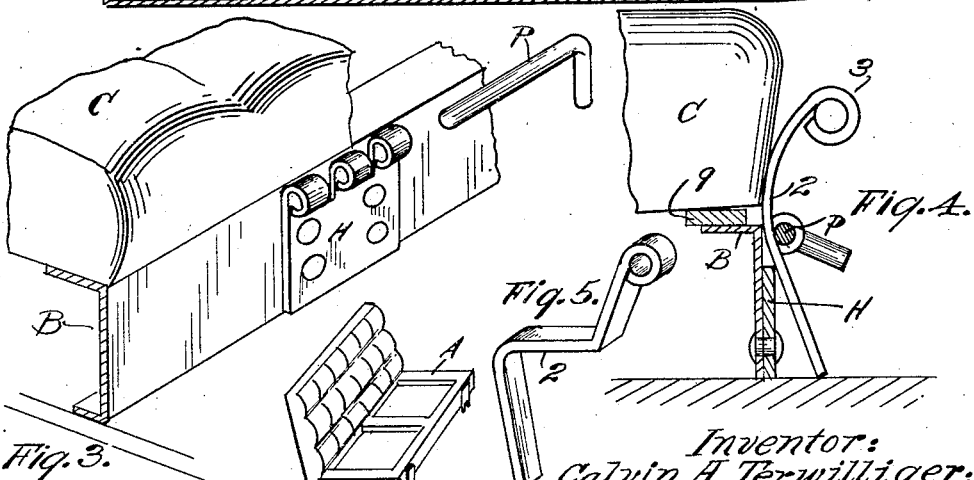
Inventor:
Calvin A. Terwilliger,
By G. E. Maynard. Atty Patented June 2, 1925.

1,539,971

UNITED STATES PATENT OFFICE.

CALVIN A. TERWILLIGER, OF LOS ANGELES, CALIFORNIA.

AUTOMOBILE BED.

Application filed November 26, 1924. Serial No. 752,435.

*To all whom it may concern:*

Be it known that I, CALVIN A. TERWILLIGER, a citizen of the United States, and resident of Los Angeles, county of Los Angeles, State of California, have invented new and useful Improvements in an Automobile Bed, of which the following is a specification.

This invention relates to vehicles, and more particularly to convertible seat and bed forming means therefor.

An object is to provide a method and apparatus for readily changing the usual seats of an automobile into a most comfortable double bed without any material changes in the stock car, such, especially, as the type of automobile having its front seat cushion detachably mounted upon a seat frame which is hinged at its front edge so that it may be tilted up to provide access to a permanent tool-box built on the floor of the car.

Ordinarily this type of front seat-frame is irremovable but a feature of my invention is to provide for its entire removal from its connection by withdrawal of its hinge pintles.

An object is to provide equipment pieces of very simple form, capable of being compactly disposed of in the utility spaces of the car when the apparatus is set up in seat arrangement. And an important object is to provide a convertible apparatus requiring additions of but negligible cost in order to enable use of the usual seat structure as a converted bed.

Other objects and advantages will be made manifest in the following specification of apparatus of the invention illustrated in the accompanying drawing; it being understood that modifications, variations,. and adaptations may be resorted to within the spirit of the invention and its scope as here claimed.

Figure 1 is a vertical, longitudinal section of the body of an automobile, showing the bed arrangement.

Figure 2 is a plan, parts being broken away.

Figure 3 is a perspective of a portion of the front seat cushion arranged on the tool-box after removal of the seat-frame, and showing the drawn hinge pintle.

Figure 4 is a detail showing the mounted, front cushion and its retaining finger.

Figure 5 is a perspective of an off-set finger.

Figure 6 is a perspective of the dismounted front seat-frame.

A present popular type of automobile has upon the forward end of its floor F a shallow tool-box B inclining down and rearwardly at its top and having on its front wall a set of hinges H to which connect the front cross-bar of a seat-frame A having a cushioned back. Thus, it is possible to tilt up the back and frame to permit access to the box B.

In my invention I employ removable pintles P having an L-head so that the pintles can be pulled from the hinge leaves to disconnect the frame F and allow it to be bodily taken from the car, after the usual front cushion C has been lifted off.

On the rear portion of the floor F is the usual fixed seat-bench D having an upwardly projecting flange E serving to retain in place the rear seat cushion R. On the floor in front of the bench is the usual foot-rest S which is adapted to be thrown forwardly to a position for use, or to be thrown back, as here shown, out of the way and close up to the bench.

Both the front and the back seat cushions are thicker at their front edges than at their rear edges.

When I desire to convert the usual seating arrangement into a bed the seat-frame A is unlocked by pulling out the hinge pintles or bolts P, having a suitable head or handle portion to facilitate insertion or removal. The front seat cushion C is placed over on the rear seat for a while and the frame A is taken out of the car. I then place the front seat-cushion directly on the uncovered tool-box, but with its thicker portion to the rear, as shown in Fig. 1, thus leveling the top. It is desirable to prevent this cushion from shifting forwardly and I provide means for such purpose, one form of which is here shown as including a stop finger 2, which may consist of a piece of strap iron for convenience having a grip or head 3. This finger is adapted to be pushed down between the replaced pintle or bolt P and the hinge part secured to the wall of the box in such manner that the finger will project up in front of the applied cushion C; one finger being inserted in each hinge H, of which there are two on the box.

The cushion R is then shifted forwardly and dropped down between the bench D and the tool-box B; the thick edge being toward the front. To level up the top of the cushion R with the front cushion C, its rear portion is propped up by suitable means which here includes the rearwardly thrown foot-rest S. To insure a firm support I prefer to place suitable slats 4 along the end arms of the foot-rest. These slats reach from the tool-box to the front of the bench and lie in an inclined position as shown in Fig. 1, holding the top of the cushion R level with that of cushion C, and somewhat higher than the rear bench D.

On the back portion of the bench I place jack-blocks 5 forming supports for the rear portion of a shelf or plate 6 whose front portion rests on the flange E of the bench in a level position to receive a small filler or leveling mattress 7 which is shaped at its front to lie over on the rear edge of the cushion R.

On the foundation formed by the cushions and the filler 7 I then lay a full length mattress 8 having a width from side to side of the car.

The cushions and the filler all abut along their edges and are held firm by the front stop fingers 2. A jack slat 9 may be laid along the box B if desired to level or lift up the front cushion C, and to prevent this cushion from shifting endwise between the side posts of the car I place at the ends of this cushion, upright filler blocks 10.

A forwardly bent stop finger 2 is shown in Fig. 5 for use if the front cushion overhangs the box.

It will be seen, therefore, that at an insignificant additional cost I have provided for the easy conversion of a standard seat structure into a capacious bed wholly within the car.

The extra parts are all of simple nature and small enough to be packed in the kit boxes or under the seats. The shelf 6 is designed to be dropped flat on the bench when the jack-blocks are dislodged.

The entire transformation, in either adaptation, can be made in a period of ten minutes.

What is claimed is:

1. Means for forming an automobile bed, including a front seat support on the floor of the automobile and having an inclined top, a rear seat bench, a rear seat cushion arranged and levelled between the bench and said support, and a backless, tapered front seat cushion supported directly in reversed, level position on the said support; all cooperating, when so arranged, to form a support for a full length mattress.

2. Means for forming an automobile bed, including a front seat support on the floor of the automobile and having an inclined top, a backless front seat cushion disposed in reverse position on said support and levelled thereby, means attached to the support for holding the applied cushion from slipping on the support, a rear seat bench, and a rear seat cushion fitting between the bench and said support; all cooperating to form a continuous support for a full length mattress.

3. In combination with an automobile having a rear seat bench, a removable rear seat cushion, a tool-box fixed to the front portion of the car floor and having hinges with removable pins for a removable tilting seat frame with a removable front seat cushion; means retained by the re-inserted hinge pins to hold the front cushion on the tool-box when the said frame is removed, means to elevate the rear seat cushion when it is disposed between the bench and said box, and mattress elevating means adjustable on the bench when the rear seat cushion is removed.

4. In an automobile, the combination with a front tool box on its floor, said tool box having an inclined top, a seat frame having a back, a front seat cushion to fit on the frame in front of its back, a rear seat cushion and a bench on which it is removably mounted, said rear seat cushion adapted to fit down between the bench and said box, of means for levelling up the rear seat cushion between the bench and box, and hinges having removable pivot pins for detachably connecting said frame to the box, whereby to allow the frame to be disconnected from its usual position on the box to permit the said front cushion to be applied in reversed, level surface position upon the box and enabling the spreading of a full length mattress over the adjusted cushions and back seat bench, and bent retaining fingers to engage the front cushion and hold it on the box, said fingers being adapted to interlock between the hinge pins and the box wall.

CALVIN A. TERWILLIGER.

Witness:
F. E. MAYNARD.